United States Patent [19]
Watanabe

[11] Patent Number: 5,432,890
[45] Date of Patent: Jul. 11, 1995

[54] CHARACTER PROCESSING APPARATUS CAPABLE OF AUTOMATIC KERNING

[75] Inventor: Kiyoshi Watanabe, Kawasaki, Japan

[73] Assignee: Canon Kabushiki Kaisha, Tokyo, Japan

[21] Appl. No.: 319,479

[22] Filed: Oct. 7, 1994

Related U.S. Application Data

[63] Continuation of Ser. No. 956,557, Oct. 5, 1992, abandoned, which is a continuation of Ser. No. 475,989, Jan. 30, 1990, abandoned.

[30] Foreign Application Priority Data

Feb. 7, 1989 [JP] Japan ................................. 1-26618

[51] Int. Cl.$^6$ .............................................. G06T 11/60
[52] U.S. Cl. ...................................... 395/100; 395/117; 395/133; 395/144; 395/150; 395/151
[58] Field of Search ............... 395/100, 105, 110, 115, 395/116, 117, 118, 133, 134, 138, 144, 145, 146, 147, 148, 150, 151; 400/9, 12, 76, 304

[56] References Cited

U.S. PATENT DOCUMENTS

| | | | |
|---|---|---|---|
| 3,712,443 | 1/1973 | Mathews | 400/304 |
| 3,946,407 | 3/1976 | Ishii et al. | 400/304 X |
| 4,591,999 | 5/1986 | Logan | 364/523 |
| 4,907,282 | 3/1990 | Daly et al. | 395/150 X |

*Primary Examiner*—Almis R. Jankus
*Attorney, Agent, or Firm*—Fitzpatrick, Cella, Harper & Scinto

[57] ABSTRACT

A character processing apparatus includes a pattern memory for storing character patterns, a shift amount memory for storing shift amount data of the character patterns stored in the pattern memory and kerning amount data between character data, a printer or display unit for outputting the character pattern, and a kerning executor for kerning the character pattern on the basis of the shift amount data and the kerning amount data which are stored in the shift amount memory when the character pattern stored in the pattern memory is output by the printer or display unit.

23 Claims, 7 Drawing Sheets

CHARACTER PROCESSING APPARATUS CAPABLE OF AUTOMATIC KERNING

This application is a continuation of application Ser. No. 07/956,557 filed Oct. 5, 1992 now abandoned which is a continuation of application Ser. No. 07/475,989 filed Jan. 30, 1990 now abandoned.

BACKGROUND OF THE INVENTION (a) Field of the Invention

The present invention relates to a character processing apparatus for outputting character data as in a liquid crystal display unit, a CRT display unit, or a printing unit (e.g., a laser beam printer, an ink-jet printer, and a thermal printer).

(b) Related Background Art

In a conventional character processing apparatus, assume that characters are to be visually output and a shift amount of each character (the total horizontal space allotted to the character) is equal to a full-size fixed pitch (d1). In this case, when characters having different character widths (C1 to C3) are adjacent to each other, as shown in FIG. 7, the character intervals are not equal to each other to which result in poor appearance. In one method proposed to solve the above problem, the width $D_i$ allotted to the ith character includes a predetermined value m added to the start and end of each character width $C_i$, respectively, thereby obtaining equal character shift amounts, as shown in FIG. 8. Referring to FIG. 8, when the character widths of characters "く" (/ku/), "う" (/u/), and "き" (/ki/) are given as C1, C2, and C3, respectively, their shift amounts D1, D2, and D3 are changed to (C1+2m), (C2+2m), and (C3+2m). As compared with the case of FIG. 7, more natural character intervals are obtained. Even if the character shift amounts are determined as described above, however, the character intervals may be unnatural, depending on the particular combination of characters involved.

FIG. 9 shows an example wherein a predetermined value n is added to the start and to the end of each character width of each of the characters "ア" (/a/), "イ" (/i/), "ノ" (/no/), and "ジ" (/ji/), and the resultant characters are output in the same manner as in FIG. 8. As shown in FIG. 9, unnatural spaces are typically formed between the characters, depending on the combination of characters. In order to solve this problem, as shown in FIG. 10, character box 91 is moved so as to overlap with box 90 by a distance l1, character box 92 is moved to overlap with box 91 by a distance #2, and box 93 is not moved, thus performing kerning. Kerning is performed manually such that a character shift amount is adjusted character by character. Alternatively, kerning is performed automatically such that combinations (kerning pairs) of all characters requiring kerning and pair shift amount adjustment data are prepared in advance.

This, however, poses the following problems.

(1) When manual kerning is performed, significant operator skill required, and kerning mainly depends on individual experience.

(2) Manual kerning is not efficient since each character of document data must be checked.

(3) When automatic kerning is performed for text written in a language using a large number of characters, as in the Japanese language, a way large number of kerning pairs must be prepared. Therefore, the required capacity of the kerning table is increased, and the capacity required for a memory for storing the kerning table is inevitably increased.

(4) Since the kerning table stores data in units of types, kerning of a combination of characters having different types cannot be performed.

(5) User's definition characters and the like cannot be kerned.

SUMMARY OF THE INVENTION

It is an object of the present invention to provide a character processing apparatus which avoids these problems.

According to one aspect of the invention is provided a character processing apparatus wherein distances between character patterns and character sizes including space portions of the respective character patterns are stored, a minimum distance between adjacent character patterns is calculated and is compared with a predetermined value, and the distance between the adjacent characters is adjusted when the minimum value is larger than the predetermined value, thereby automatically adjusting the spacings between characters.

It is another object of the present invention to provide a character processing apparatus capable of performing fully-automatic kerning efficiently without depending on operator experience (as with manual kerning).

It is still another object of the present invention to provide a character processing apparatus which does not require a kerning table, unlike the conventional apparatus even if the number of characters in the writing system involved is large, thereby reducing the storage capacity of the kerning table.

It is still another object of the present invention to provide a character processing apparatus capable of performing kerning of all combinations of user's definition characters as well as Japanese characters, characters of all other languages, and symbols.

It is still another object of the present invention to provide a character processing apparatus capable of freely changing kerns of characters in units of characters or character strings.

DETAILED DESCRIPTION OF THE PREFERRED EMBODIMENTS

Preferred embodiments of the present invention will be described with reference to the accompanying drawings.

Figure 1:
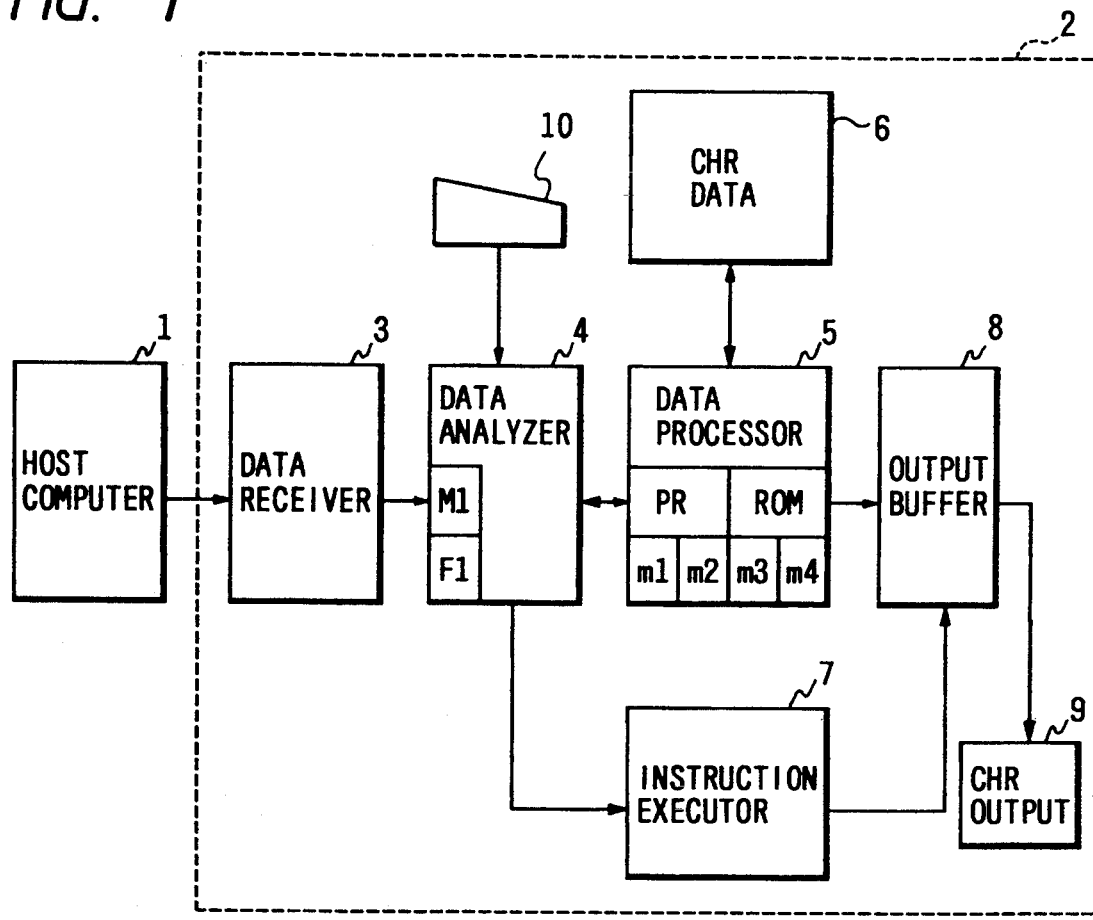
FIG. 1 is a block diagram showing a schematic arrangement of character processing apparatus according to an embodiment of the present invention.

Description of Character Processing Apparatus (FIG. 1)

Figure 2:
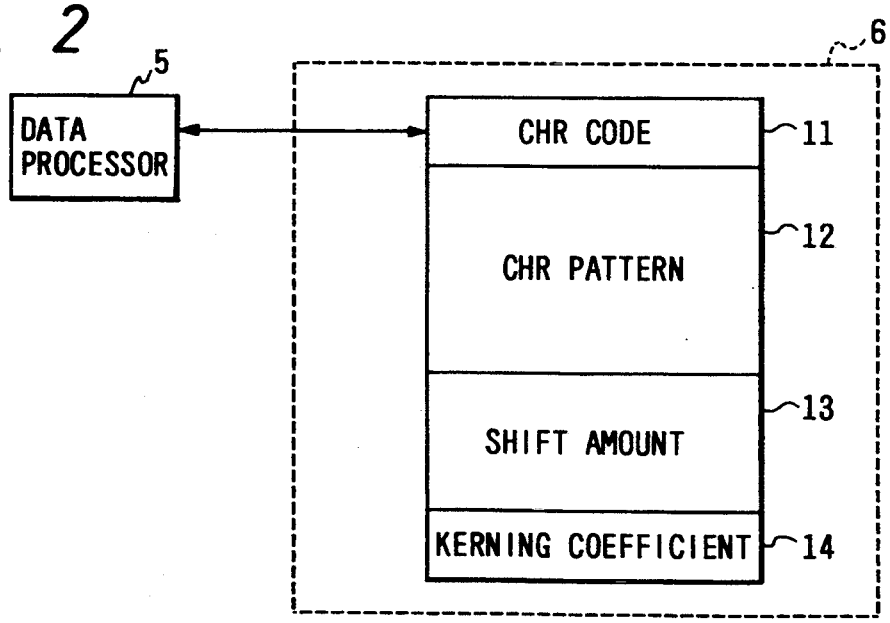
FIG. 2 is a detailed block diagram of a character data unit shown in FIG. 1.

FIGS. 1 and 2 are block diagrams showing an arrangement of a character processing apparatus of the embodiment of the present invention.

Referring to FIGS. 1 and 2, a host computer 1 of an external device outputs print or display data to a character processing apparatus 2. The print data sent from the host computer 1 is supplied to a data receiver 3 of the character processing apparatus 2. A data analyzer 4 analyzes the data received by the data receiver 3 or input through a keyboard 10 (to be described later) to determine whether that data is print (display) data or other data. Of all data analyzed by the data analyzer 4, only print (display) data is processed by a data processor 5, and its detailed operation will be described later with reference to FIG. 3.

A character data unit 6 stores data related to characters, and its detailed arrangement will be described later with reference to FIG. 2. Of all the data analyzed by the data analyzer 4, data other than the print (display) data is processed by an instruction executor 7. An output buffer 8 temporarily stores the output data from the instruction executor 7 in the form of pixel data and outputs it to a character output unit 9. The character output unit 9 comprises a display unit for displaying data from the output buffer 8 or a printing machine (printer) for printing this data. The keyboard 10 includes numeric keys, letter keys, and the like and can set a desired kerning coefficient (to be described later).

Figure 5:
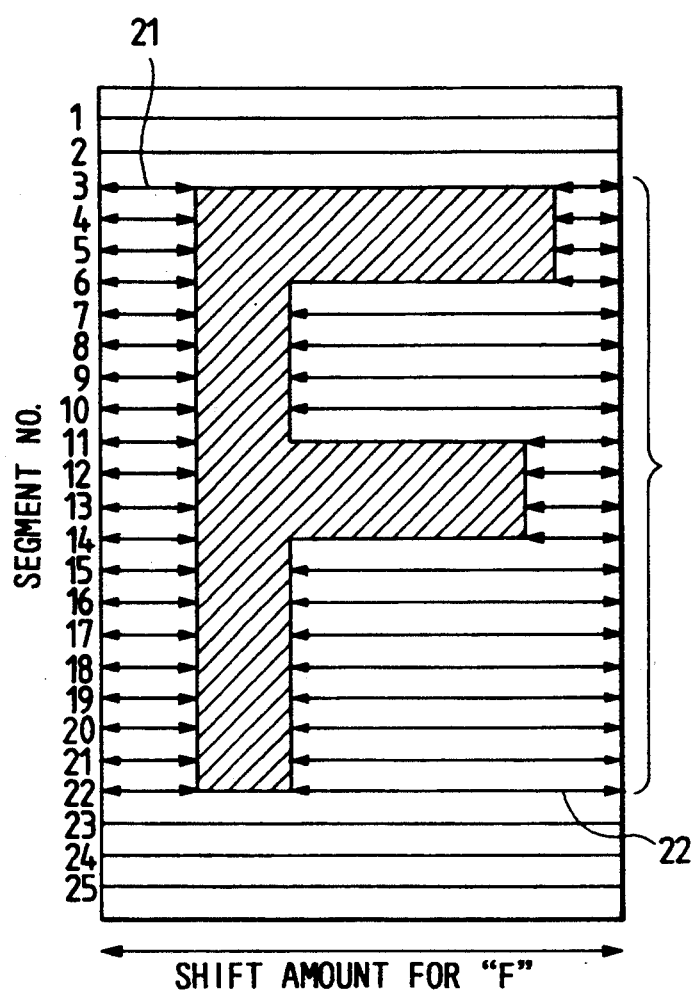
FIG. 5 is a view showing a relationship between a character pattern and a shift amount.
Figure 6:
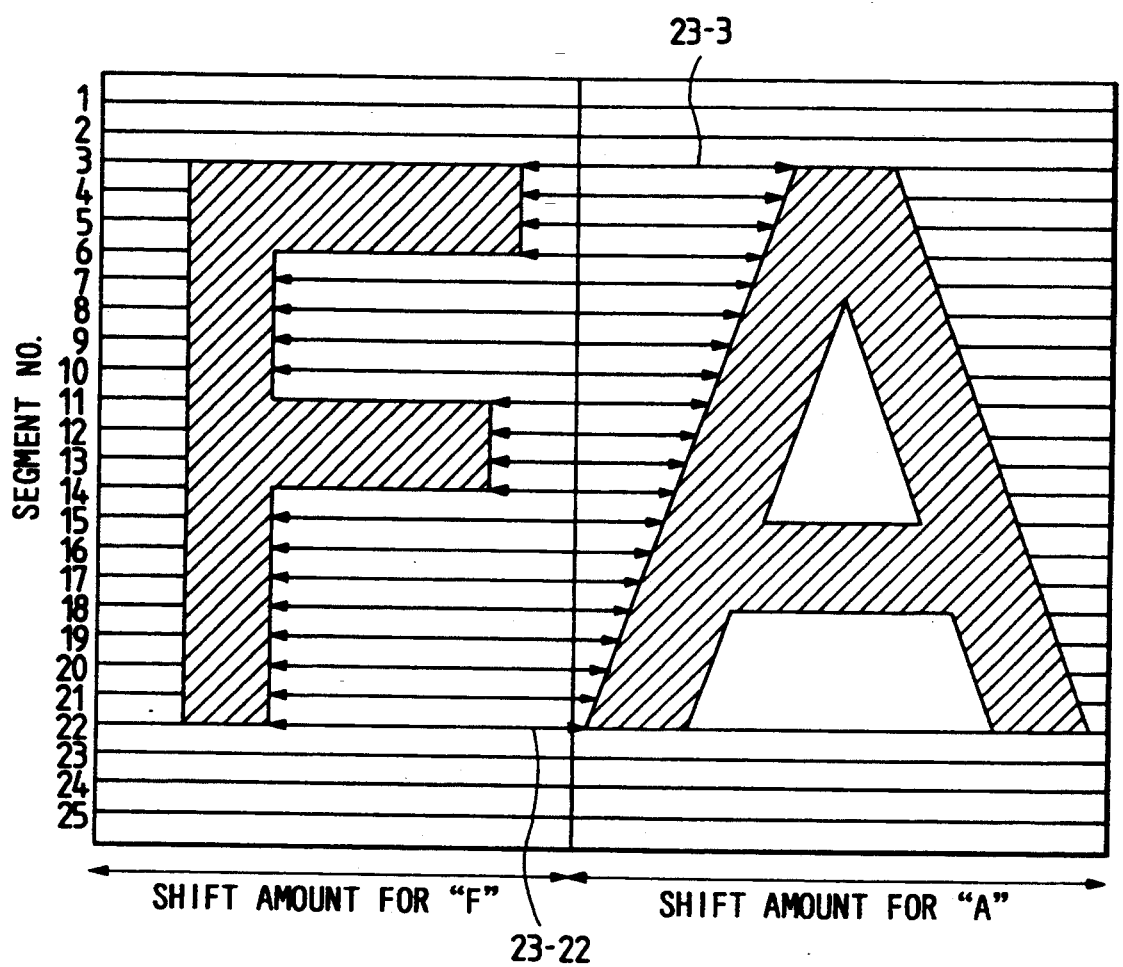
FIG. 6 is a view for explaining an interval between two adjacent characters in units of segments.
Figure 7:
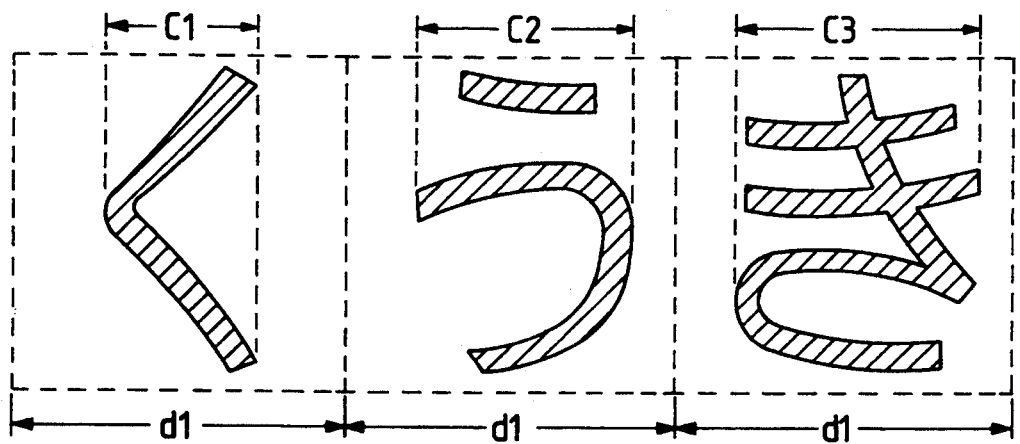
FIG. 7 is a view showing a character string when a character shift amount is a full-size fixed pitch.
Figure 8:
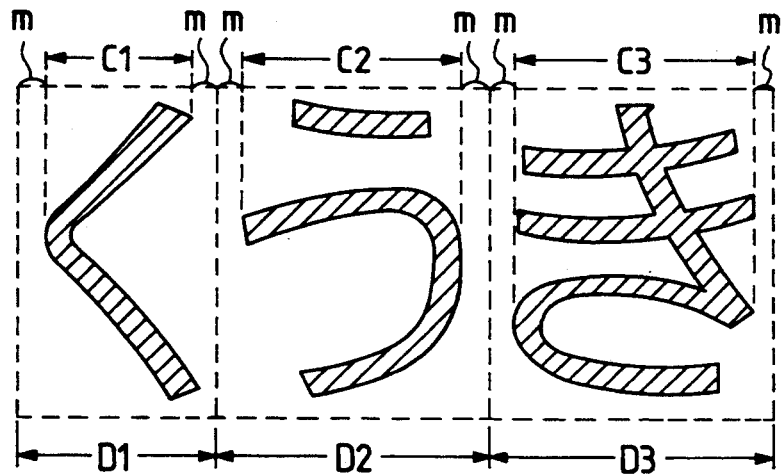
FIGS. 8 and 9 are views showing character strings when the character shift amount is a proportional pitch.

Description of Character Data Unit (FIGS. 2 and 5)

FIG. 2 is a diagram showing a detailed arrangement of a data structure of the character data unit 6.

The character data unit 6 consists of a character 1 code data section 11, a character pattern data section 12, a shift amount data section 13, and a kerning coefficient data section 14. The character code information section 11 stores codes of the respective character data. The character pattern data section 12 stores a plurality of character patterns. The shift amount data section 13 stores shift amount data of the respective character patterns stored in the character pattern data section 12. The kerning coefficient data section 14 stores kerning coefficients. This section may store reference kerning coefficients or values set at the keyboard 10. The kerning coefficients may be stored in units of characters or lines.

This embodiment will be described in detail with reference to the character "F" illustrated in FIG. 5.

The shift amount of character "F" in FIG. 5 is shown in a rectangle represented by the shift amount for character "F", termed a shift bos. The character can be represented by numbers, respectively representing the horizontal length of one horizontal slice, or segment of the character, and distances of the segment between the character patterns. For each non-zero segment, there are, as shown, two respective distances respective 21 and 22 to the side boundaries of the shift box. The character data unit 6 stores character patterns and shift amounts in correspondence with character codes.

When a character code is input from the data processor 5, the character pattern and the character shift amount which correspond to this input character code are output from the character data unit 6.

Description of Character Processing Apparatus (FIGS. 1 to 6)

Figure 3:
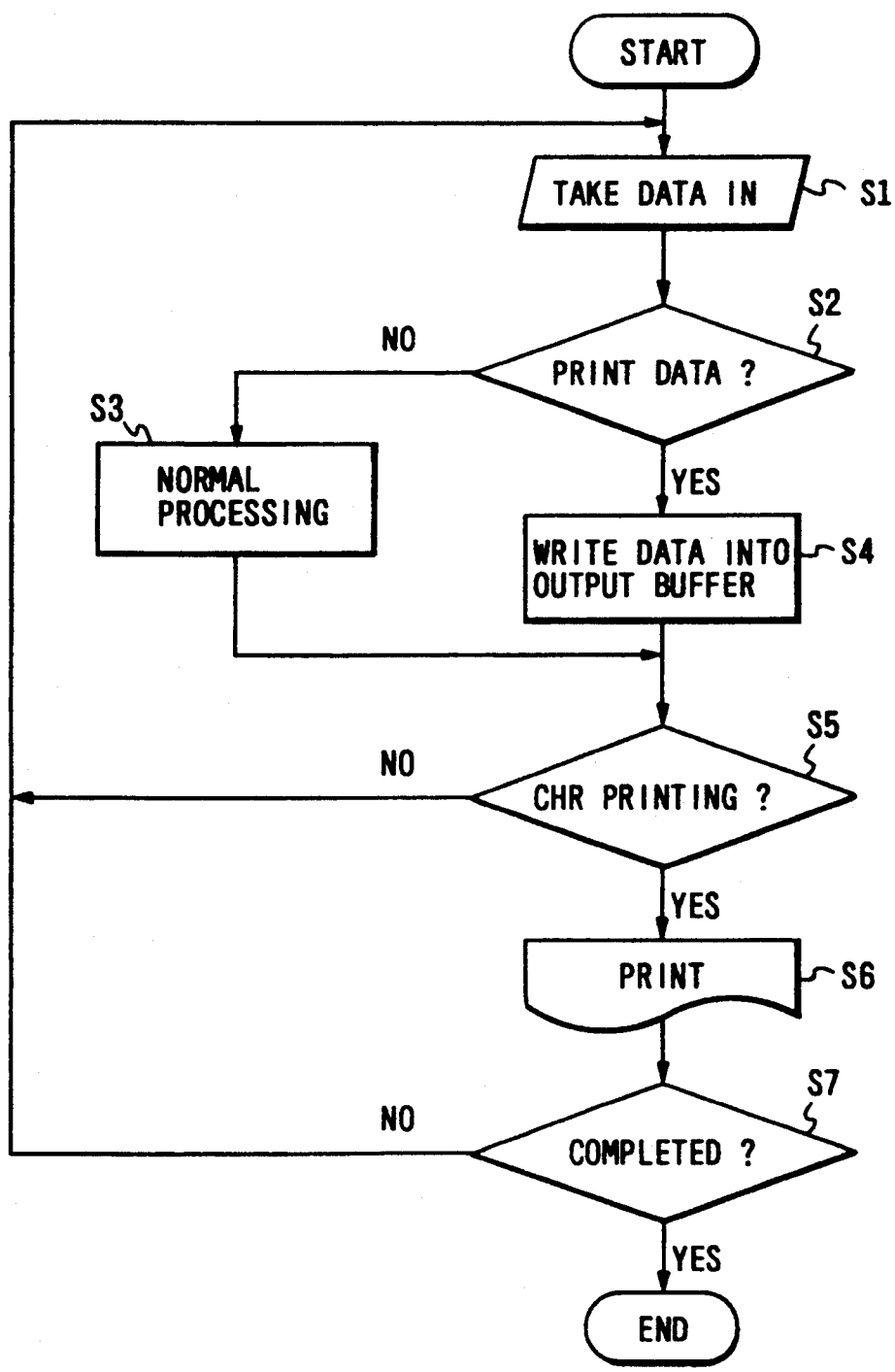
FIG. 3 is a flow chart showing a control sequence of the character-processing apparatus shown in FIG. 1.

FIG. 3 is a flow chart showing a control sequence of the character processing apparatus 2 of this embodiment. A program for realizing the flow chart is stored in a ROM in the data processor 5. A printer is exemplified as the character output unit 9 in the following description.

In step S1, data sent from the host computer 1 and received by the data receiver 3 or data from the keyboard 10 is taken in and analyzed by the data analyzer 4. It is checked in step S2 whether the input data is print data. If NO in step S2, the flow advances to step S3, and an instruction is executed by the instruction executor 7. However, if YES in step S2, the flow advances to step S4, and the character data is read out from the character data unit 6. At the same time, the shift amount is read out from the shift amount data section 13. The data processor 5 performs data processing using the read-out data and writes the processed data into the output buffer 8.

It is determined in step S5 whether character printing is to be performed. If YES in step S5, the flow advances to step S6. If NO in step S5, the flow returns to step S1. In step S6, the contents of the output buffer 8 are read out and sequentially output to the character output unit 9, thereby displaying the processed data at the character output unit 9. It is determined in step S7 whether character output processing is completed. If NO in step S7, the flow returns to step S1.

Figure 4:
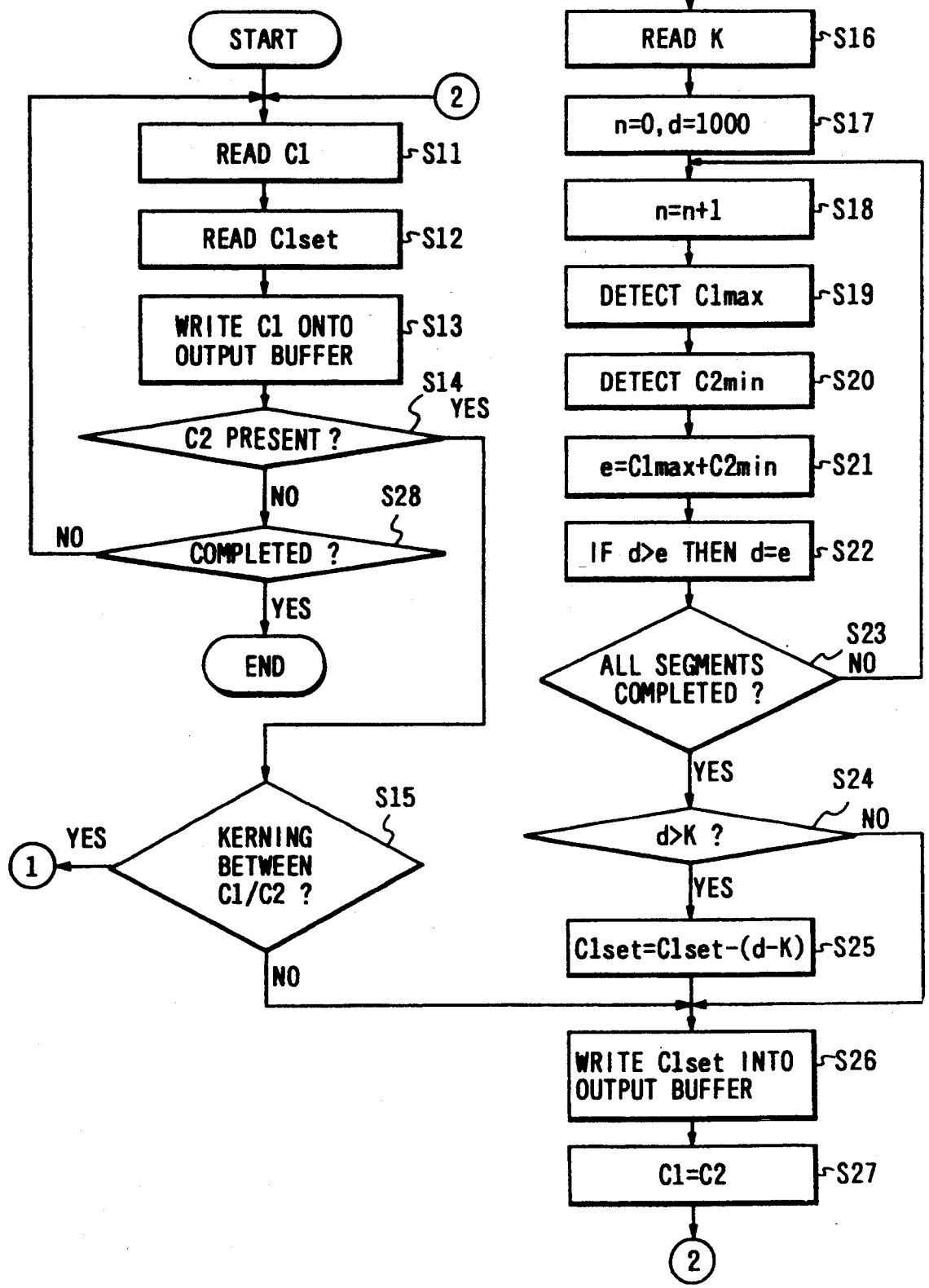
FIG. 4 is a detailed flow chart of step S4 shown in FIG. 3.

FIG. 4 shows a detailed content of step S4 in FIG. 3 and best illustrates the characteristic feature of this embodiment.

In steps S11 and S12 of FIG. 4, the first character pattern data C1 and the first shift amount data C1 set are read out from the character pattern data section 12 and the shift amount data section 13, respectively. Of these read-out data, only the character pattern data C1 is written into the output buffer 8 in step S13. It is then determined in step S14 whether the next adjacent character C2 is present. If YES in step S14, the flow advances to step S15. Otherwise, the flow advances to step S28.

It is determined in step S15 whether a kerning instruction is included in the data to check if a flip-flop F1 in the data analyzer 4 is set. If it is determined that the flip-flop F1 is set and kerning is to be performed, the flow advances to step S16. Otherwise, the flow advances to step S26.

In step S16, a kerning coefficient K is read out from the kerning coefficient data section 14 and stored in a memory m1 in the data processor 5. In step S17, "0" is set as the value of a segment number n, and "1,000" is set as an initial value of a distance between two characters, for each segment. These values are respectively set in memories m2 and m3 in the data processor 5. In step S18, the value of the segment number n is incremented by one. In step S19, a distance C1max from the end of the character pattern C1 to the beginning of the shift amount character box in the designated segments is detected. In step S20, a distance C2min from the end of the adjacent character pattern C2 to the end of the shift amount character box is detected.

The flow then advances to step S21. The values detected in steps S19 and S20 are added to each other by an arithmetic section PR in the data processor 5 to obtain a distance e between the adjacent characters on a given segment. In step S22, the distance e is compared with the distance d between the adjacent characters of the immediately preceding segment. If d>e, then d is set equal to e. It is determined in step S23 whether processing of all segments is completed. If NO in step S23, the flow returns to step S18. Otherwise, the flow advances to step S24.

When the operations in steps S18 to S23 are completed, measurements of distances between every two adjacent characters for all segments are completed. The value of the minimum distance between the two adjacent characters remains d in step S24. This will be described with reference to FIG. 6. For each pair of adjacent characters, distances 23-3 to 23-22 for all segments are calculated, and the minimum value is given as d. The flow then advances to step S24, and the arithmetic section PR in the data processor 5 compares the predetermined kerning coefficient K with the distance d. If the value of the distance d is smaller than the coefficient K, the distance between the two adjacent characters is kept unchanged. For this purpose, the flow advances to step S26. Otherwise, the flow advances to step S25.

If a distance between the two adjacent characters is smaller than the kerning coefficient K and kerning cannot be performed, the value of the shift amount C1 set in step S12 is kept unchanged. If kerning can be performed, the value (d−K) is subtracted from the amount C1 set to obtain a new amount C1 set. In step S26, the new shift amount C1 set is written into the output buffer 8.

Kerning between the two target characters is now completed. In step S27, the character C2 is set as the character C1, and the flow returns to step S11.

When no adjacent the next character is present in step S14, the flow advances to step S28 and determine whether kerning is completed. If NO in step S28, the flow returns to step S11. However, if YES in step S28, all the operations are completed.

Figure 9:
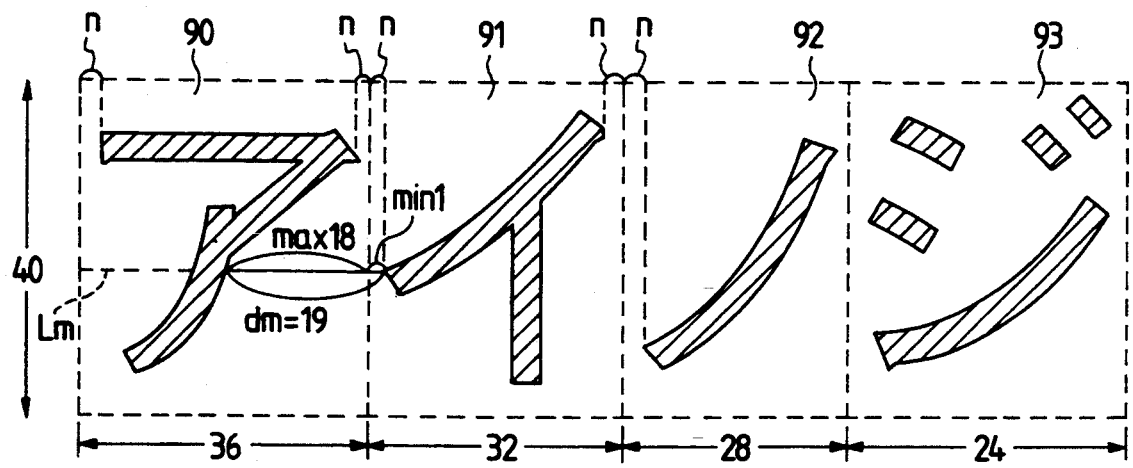

The above operations will be described in more detail with reference to FIG. 9. Assume that the number of segments of characters "ア, イ, ノ, ツ" is 40, the shift amounts of these characters which are stored in the shift amount data section 13 are respectively 36, 32, 28, and 34, and the kerning coefficient K is 14.

Figure 10:
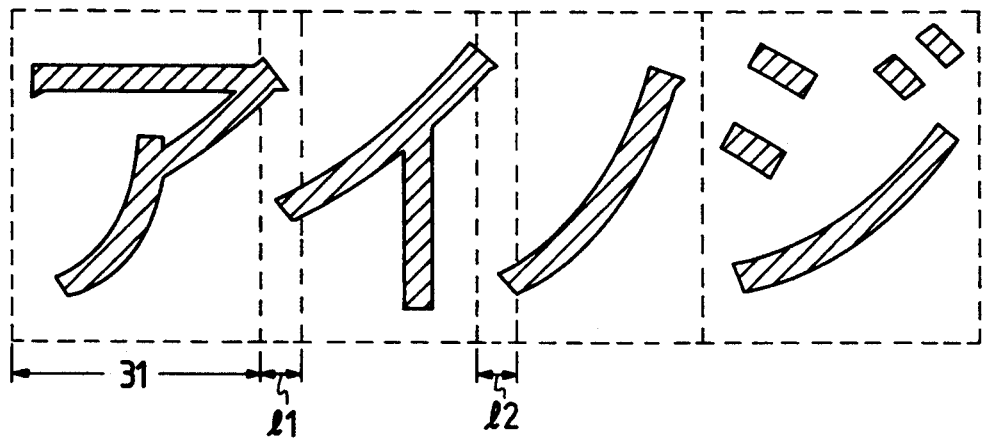
FIG. 10 is a view showing a character string obtained after kerning of the embodiment of the present invention.

The minimum distance dm between the characters "ア" and "イ" on a segment Lm is given as dm=maX18+min1=19. In step S24, condition d>K is satisfied. The shift amount corrected in step S25 is 31 (=36−(19−14)). As shown in FIG. 10, the value of S1 becomes 5 (=36−31), and the shift amount is corrected.

In the above embodiment, character codes, character patterns, and shift amounts are stored in the character data unit 6, and the distance between the character pattern and the shift amount box on a given segment is obtained by a calculation. However, according to another embodiment, distances between the character patterns and the shift amount boxes may be stored in the character data unit 6 for each character pattern. In this case, in steps S19 and S20 of FIG. 4, distances C1max and C2min between the character pattern and the shift amount box of the designated segment are read out from the character data unit 6.

FIG. 5 shows only horizontal distance data of the letter "F". However, if vertical distance data of characters are provided, kerning can be applied to vertical composition of Japanese characters and the like in addition to horizontal composition (in, e.g., European languages).

Extraction of the values of distances between two adjacent characters need not be performed for all segments. Instead, such extraction can be performed for a limited number of segments.

The following effects can be obtained by the embodiments described above.

(1) Since kerning can be perfectly automatically performed, efficiency can be improved and operator experience and skill are not required as with manual kerning.

(2) Since a kerning table need not be used even if the number of characters to be processed is increased, a required storage capacity can be reduced.

(3) Kerning can be performed for all combinations of user's definition characters in addition to Japanese characters, characters of any other languages, and other symbols.

According to the present invention as described above, values of distances between the character patterns and the character sizes including the space portions of the character patterns are stored, a minimum distance between the adjacent character patterns is obtained at the time of character output and is compared with a predetermined value, and the distance between the adjacent characters is adjusted when the minimum distance is larger than the predetermined distance, thereby automatically adjusting the character spacings.

What is claimed is:

1. A character processing apparatus comprising:
   storage means for storing character patterns and shift amounts of the character patterns;
   output means for outputting the character patterns stored in said storage means;
   means for calculating a minimum distance between an end of a character pattern and a left end of an adjacent character pattern, based on the shift amounts stored in said storage means, prepatory to outputting of the character patterns stored in said storage means; and
   output control means for causing said output means to output the adjacent two character patterns spaced apart by an interval determined by the output control means in accordance with the minimum distance calculated by said calculating means.

2. An apparatus according to claim 1, wherein said output means is a printer.

3. An apparatus according to claim 1, wherein said output means is a display unit.

4. An apparatus according to claim 1, further comprising input means for inputting code data for designating the character patterns stored in said storage means.

5. A character processing apparatus comprising:
   memory means for storing a plurality of character patterns, shift amounts of the character patterns and character size data including space portions between the character patterns;
   output means for outputting the character patterns stored in said memory means;
   means for calculating a minimum distance between an end of a character pattern and a left end of an adjacent character pattern on the basis of the character patterns, the shift amounts of the character patterns and the character size data which are stored in said memory means; and output control means for causing said output means to output the adjacent two character patterns spaced apart by an interval based on a predetermined value when the minimum distance exceeds said predetermined value.

6. An apparatus according to claim 5, wherein said output means is a printer.

7. An apparatus according to claim 5, wherein said output means is a display unit.

8. A character processing apparatus comprising:

memory means for storing character patterns, shift amounts of the character patterns and distances between the character patterns and ends of the shift amounts for each of plural segments of each of the character patterns;

means for calculating a distance between an end of a character pattern and a left end of an adjacent character pattern on a given segment on the basis of the character patterns, the shift amounts of the character patterns and the distances which are read out from said memory means;

output means for outputting the character patterns; and output control means for causing said output means to output the adjacent two character patterns spaced apart by an interval controlled in accordance with the distance calculated by said calculating means.

9. An apparatus according to claim 8, wherein said output means is a printer.

10. An apparatus according to claim 8, wherein said output means is a display unit.

11. An apparatus according to claim 8, further comprising input means for inputting code information for designating the character patterns stored in said memory means.

12. A method for processing characters comprising the steps of:

storing character patterns and shift amounts of the character patterns;

outputting the character patterns that have been stored;

calculating a minimum distance between an end of a character pattern and a left end of an adjacent character pattern, based upon the stored shift amounts, prepatory to outputting of the character patterns that have been stored; and causing two adjacent character patterns to be spaced apart by an interval determined in accordance with the minimum distance calculated during said calculating step.

13. A method for processing characters according to claim 12, wherein the step of outputting the character patterns comprises printing.

14. A method for processing characters according to claim 12, wherein the step of outputting the character patterns comprises displaying.

15. A method for processing character patterns according to claim 12, further comprising the step of inputting code data for designating the character patterns that have been stored.

16. A method for processing characters comprising the steps of:

storing a plurality of character patterns, shift amounts of the character patterns and character size data including space portions between the character patterns;

outputting the character patterns that have been stored;

calculating a minimum distance between an end of a character pattern and a left end of an adjacent character pattern on the basis of the character patterns, shift amounts of the character patterns and the character size data which have been stored during said storing step; and causing two adjacent character patterns to be spaced apart by an interval based on a predetermined value when the minimum distance exceeds the predetermined value.

17. A method for processing characters according to claim 16, wherein the step of outputting the character patterns comprises printing.

18. A method for processing characters according to claim 16, wherein the step of outputting the character patterns comprises displaying.

19. A method for processing character patterns according to claim 16, further comprising the step of inputting code data for designating the character patterns that have been stored.

20. A method for processing characters comprising the steps of:

storing character patterns, shift amounts of the character patterns, and distances between the character patterns and ends of the shift amounts for each of plural segments of each of the character patterns;

calculating a distance between an end of a character pattern and a left end of an adjacent character pattern on a given segment on the basis of the character patterns, shift amounts of the character patterns and the distances which have been stored during said storing step;

outputting the character patterns that have been stored; and causing two adjacent character patterns to be spaced apart by an interval controlled in accordance with the distance between the adjacent character patterns calculated during said calculating step.

21. A method for processing characters according to claim 20, wherein the step of outputting the character patterns comprises printing.

22. A method for processing characters according to claim 20, wherein the step of outputting the character patterns comprises displaying.

23. A method for processing character patterns according to claim 20, further comprising the step of inputting code information for designating the character patterns that have been stored.

* * * * *

UNITED STATES PATENT AND TRADEMARK OFFICE
CERTIFICATE OF CORRECTION

PATENT NO. : 5,432,890
DATED : July 11, 1995
INVENTOR(S) : KIYOSHI WATANABE

It is certified that error appears in the above-identified patent and that said Letters Patent is hereby corrected as shown below:

COLUMN 1

Line 25, "result" should read --results--.
Line 51, "distance #2," should read --distance 12,--.
Line 61, "skill" should read --skill is--.
Line 67, "way" should read --very--.

COLUMN 2

Line 33, "apparatus" should read --apparatus,--.

COLUMN 3

Line 42, "1" should be deleted.
Line 60, "bos." should read --box.--.
Line 65, "respective" (second occurrence) should be deleted.

COLUMN 4

Line 40, "C1 set" should read --C1set--.

COLUMN 5

Line 32, "C1 set" should read --C1set-- and "C1 set." should read --C1set.--.
Line 33, "C1 set" should read --C1set--.
Line 38, "the next" should be deleted.
Line 39, "determine" should read --determines--.
Line 51, "maX18" should read --max18--.

UNITED STATES PATENT AND TRADEMARK OFFICE
CERTIFICATE OF CORRECTION

PATENT NO. : 5,432,890
DATED : July 11, 1995
INVENTOR(S) : KIYOSHI WATANABE

It is certified that error appears in the above-identified patent and that said Letters Patent is hereby corrected as shown below:

<u>COLUMN 6</u>

Line 43, "prepatory" should read --preparatory--.

<u>COLUMN 7</u>

Line 49, "prepatory" should read --preparatory--.

Signed and Sealed this

Nineteenth Day of December, 1995

Attest:

*Attesting Officer*

BRUCE LEHMAN
*Commissioner of Patents and Trademarks*